US012229563B2

(12) United States Patent
Kosuru et al.

(10) Patent No.: US 12,229,563 B2
(45) Date of Patent: Feb. 18, 2025

(54) SPLIT REGISTER LIST FOR RENAMING

(71) Applicant: Advanced Micro Devices, Inc., Santa Clara, CA (US)

(72) Inventors: Sree Harsha Kosuru, Fort Collins, CO (US); Eric Dixon, Fort Collins, CO (US); Erik Swanson, Fort Collins, CO (US); Michael Estlick, Fort Collins, CO (US); Patrick Michael Lowry, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/855,727

(22) Filed: Jun. 30, 2022

(65) Prior Publication Data
US 2024/0004664 A1    Jan. 4, 2024

(51) Int. Cl.
*G06F 9/30*    (2018.01)
*G06F 9/38*    (2018.01)
(52) U.S. Cl.
CPC .......... *G06F 9/384* (2013.01); *G06F 9/30123* (2013.01)
(58) Field of Classification Search
CPC ................ G06F 9/384; G06F 9/30123
See application file for complete search history.

(56) References Cited

U.S. PATENT DOCUMENTS

| 8,707,015 | B2 | 4/2014 | Rupley et al. |
| 2009/0240757 | A1 | 9/2009 | Yoshida |
| 2012/0110305 | A1* | 5/2012 | Lien ................... G06F 9/30123 712/E9.025 |
| 2015/0134935 | A1* | 5/2015 | Blasco ................... G06F 9/384 712/220 |
| 2017/0192789 | A1* | 7/2017 | Malladi ............... G06F 9/30109 |
| 2019/0190536 | A1 | 6/2019 | Swanson et al. |
| 2019/0310856 | A1 | 10/2019 | Ayzenfeld et al. |
| 2020/0073668 | A1 | 3/2020 | Chu et al. |

OTHER PUBLICATIONS

Pita et al.; Sectored Renaming for Superscalar Microprocessors; 1999; IEEE (Year: 1999).*
Kondo et al.; A Small, Fast and Low-Power Register File by Bit-Partitioning; 2005; IEEE (Year: 2005).*
International Search Report and Written Opinion from corresponding International Application No. PCT/US2023/069352, mailed Oct. 23, 2023 (9 pages).

* cited by examiner

*Primary Examiner* — Corey S Faherty
(74) *Attorney, Agent, or Firm* — Greenberg Traurig, LLP

(57) ABSTRACT

The disclosed system may include a processor configured to detect that a data unit size for an instruction is smaller than a register. The processor may allocate a first portion of the register to the instruction in a manner that leaves a second portion of the register available for allocating to an additional instruction. The processor may also track the register as a split register. Various other methods, systems, and computer-readable media are also disclosed.

20 Claims, 13 Drawing Sheets

SPLIT REGISTER LIST FOR RENAMING

BACKGROUND

Modern processor architectures may incorporate various features to improve performance. For example, a processor may be able to execute instructions, such as processor-level micro-operations (uops or pops) that are decoded from program code, non-sequentially or out of order. Instructions may access registers (e.g., fast local storage in a processor that may hold data for instructions to operate on), and more specifically architectural registers (e.g., registers defined by an instruction architecture that may be visible to software and may be abstract from the physical registers in the processor) to perform operations.

Because instructions may be executed out of order, an instruction may modify an architectural register in a way that may alter another instruction. For example, a first instruction may need a result of a second instruction to be stored in an architectural register whereas another instruction may load a value into the architectural register. Loading the value into the architectural register may prevent the first instruction from operating on the correct value. To prevent such scenarios, the processor may map architectural registers or other logical registers (e.g., registers that are abstracted from physical registers) to different physical registers during a renaming phase of an instruction pipeline for the processor. The processor may include more physical registers than a number of architectural registers defined in the instruction architecture.

During the renaming phase, the processor may select a free physical register for mapping. Thus, the processor may track which of its physical registers are free. In some architectures, the processor may support instructions of different register sizes. For instance, some instructions may use architectural registers that each correspond to two physical registers, whereas other instructions may use architectural registers that each correspond to one physical register. To simplify management of registers, the processor may manage physical registers based on a largest supported architectural register size.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
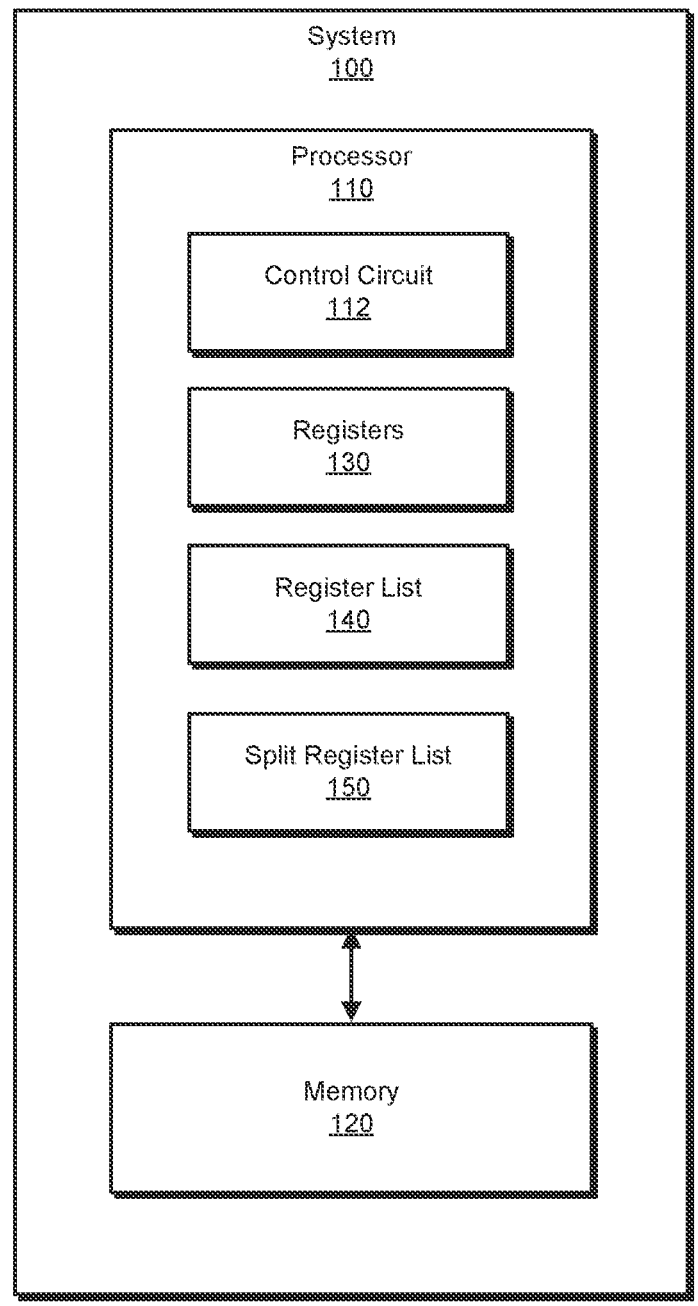
FIG. 1 is a block diagram of an exemplary system for managing free registers for renaming using a split register list.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

As will be described in greater detail below, the instant disclosure describes various systems and methods for managing split registers in a split register list for renaming. To simplify management of registers, a processor may manage physical registers based on a largest supported architectural register size. However, such a scheme may result in physical registers being unused, for instance when supporting instructions of smaller sizes. Thus, in one example, a method for managing split registers for renaming may include detecting that a data unit size for an instruction is smaller than a register and allocating a first portion of the register to the instruction in a manner that leaves a second portion of the register available for allocating to an additional instruction. The method may also include tracking the register as a split register.

In some examples, tracking the register may include marking the register in a split register list. The split register list may track a split register based on one of even or odd address value such that the corresponding second portion has the other of even or odd address value. In some examples, the method may further include unmarking, in the split register list, the register when the first portion and the second portion are free.

In some examples, the method may include selecting the register from a free register list. Free registers may each be tracked in the free register list as a pair of register portions. In addition, the method may include tracking, in a free register portion list, the second portion of the register.

In some examples, the method may include marking the first portion as free when the instruction completes. In some examples, the method may also include allocating the second portion to a second instruction. In some examples, the data unit size may correspond to an instruction width of the instruction. In some examples, a size of the register may correspond to a wide instruction width.

In one example, a method for managing split registers for renaming may include detecting that a data unit size for an instruction is smaller than a register size and selecting, for the instruction from a free register list, a free register having the register size. The method may also include allocating a first portion of the selected register to the instruction in a manner that leaves a second portion of the selected register available for allocating to an additional instruction and tracking the selected register as a split register in a split register list.

In one implementation, a system for managing split registers for renaming may include a physical memory, and at least one physical processor including a plurality of registers and a control circuit for managing allocation of registers for instructions. The control circuit configured to select, for an instruction having a data unit size smaller than a register, a free register of the plurality of registers from a free register list. The control circuit may be further configured to allocate a first portion of the selected register to the instruction in a manner that leaves a second portion of the selected register available for allocating to an additional instruction and track the selected register as a split register in a split register list.

Features from any of the above-mentioned implementations may be used in combination with one another in accordance with the general principles described herein. These and other implementations, features, and advantages will be more fully understood upon reading the following detailed description in conjunction with the accompanying drawings and claims.

The present disclosure is generally directed to splitting registers during a rename phase of a processor's instruction pipeline. As will be explained in greater detail below, the present disclosure provides systems and methods for splitting and tracking registers that may be combinations of physical registers. Rather than tracking individual physical registers, a processor may track the combinations of physical registers (as registers) and split a combination when an instruction does not require combined registers. The processor may track whether a register is a split register using a bit vector to avoid requiring significant changes to the processor's renaming scheme.

For example, implementations of the present disclosure may detect that a data unit size for an instruction is smaller than a register. In response, implementations of the present disclosure may allocate a first portion of the register to the instruction in a manner that leaves a second portion of the register available for allocating to an additional instruction. The register may be tracked as a split register.

Features from any of the implementations described herein may be used in combination with one another in accordance with the general principles described herein. These and other implementations, features, and advantages will be more fully understood upon reading the following detailed description in conjunction with the accompanying drawings and claims.

The following will provide, with reference to FIGS. 1-6, detailed descriptions of various implementations of split register renaming. Detailed descriptions of an example system for managing split registers are provided in connection with FIG. 1. Detailed descriptions of an example renaming workflow are provided in connection with FIG. 2. Detailed descriptions of registers and a split register list are provided in connection with FIGS. 3 and 4. Detailed descriptions of an example method for managing split registers for renaming are provided in connection with FIG. 6.

FIG. 1 is a block diagram of an example system 100 for managing split registers for renaming. System 100 may correspond to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 may include one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may include one or more physical processors, such as processor 110. Processor 110 generally represents any type or form of hardware-implemented processing unit capable of interpreting and/or executing computer-readable instructions. In some examples, processor 110 may access and/or modify data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), portions of one or more of the same, variations or combinations of one or more of the same, and/or any other suitable physical processor.

In some implementations, the term "instruction" may refer to computer code that may be read and executed by a processor. Examples of instructions may include, without limitation, macro-instructions (e.g., program code that may require a processor to decode into processor instructions that the processor may directly execute) and micro-operations (e.g., low-level processor instructions that may be decoded from a macro-instruction and that form parts of the macro-instruction).

As further illustrated in FIG. 1, processor 110 may include a control circuit 112, registers 130, a register list 140, and a split register list 150. Control circuit 112 may correspond to a rename unit or other similar control unit and may include circuitry and/or instructions for allocating and/or assigning registers for instructions. Registers 130 may correspond to one or more registers of processor 110. Register list 140 may correspond to a free list that may track which of registers 130 are free (e.g., not in use) and/or which of registers 130 are not available. Split register list 150 may correspond to one or more lists that may track which of registers 130 have been split into register portions.

In some implementations, the term "register" may refer to a fast local storage of a processor that may be used to hold data for operations. Examples of registers may include, without limitation, physical registers (e.g., physical storage units in a processor), logical registers (e.g., registers that may be referenced by instructions and are dynamically mapped to physical registers), and architectural registers (e.g., registers defined by an architecture that may be visible to software and are dynamically mapped to physical registers). In some examples, a register (e.g., a pair register) may refer to more than one physical register. In some examples, a size or number of bits of a physical register may be defined by a processor's hardware architecture.

Figure 2:
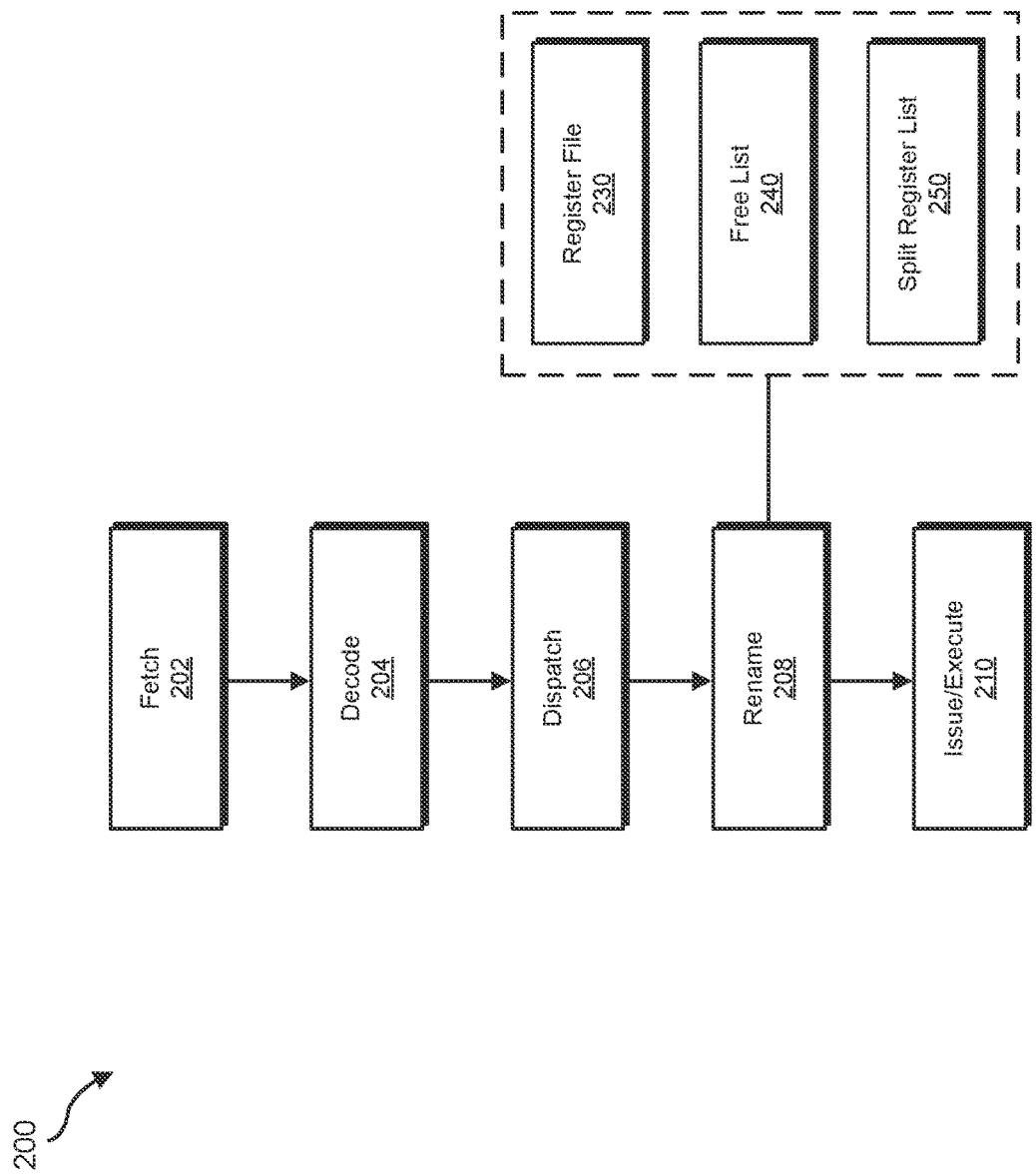
FIG. 2 is a flow diagram of an exemplary renaming workflow.

FIG. 2 illustrates an exemplary pipeline 200 for a processor, such as processor 110 (and/or a functional unit thereof), for executing instructions. During a fetch stage 202, processor 110 may read program instructions from memory 120. Processor 110 may fetch based on an active thread or other criteria. At decode stage 204, processor 110 may decode the read program instructions into micro-operations. Processor 110 (and/or a functional unit thereof) may forward the newly decoded micro-operations to a scheduler that may queue micro-operations until they are ready for dispatch. At dispatch stage 206, the scheduler may dispatch one or more micro-operations that are ready for dispatch. A micro-operation may be ready for dispatch when its dependencies (e.g., resources that may rely on other instructions to finish execution) have been resolved. In some examples, the scheduler may select a ready micro-operation in response to an execution unit of processor 110 becoming available.

Figure 3:
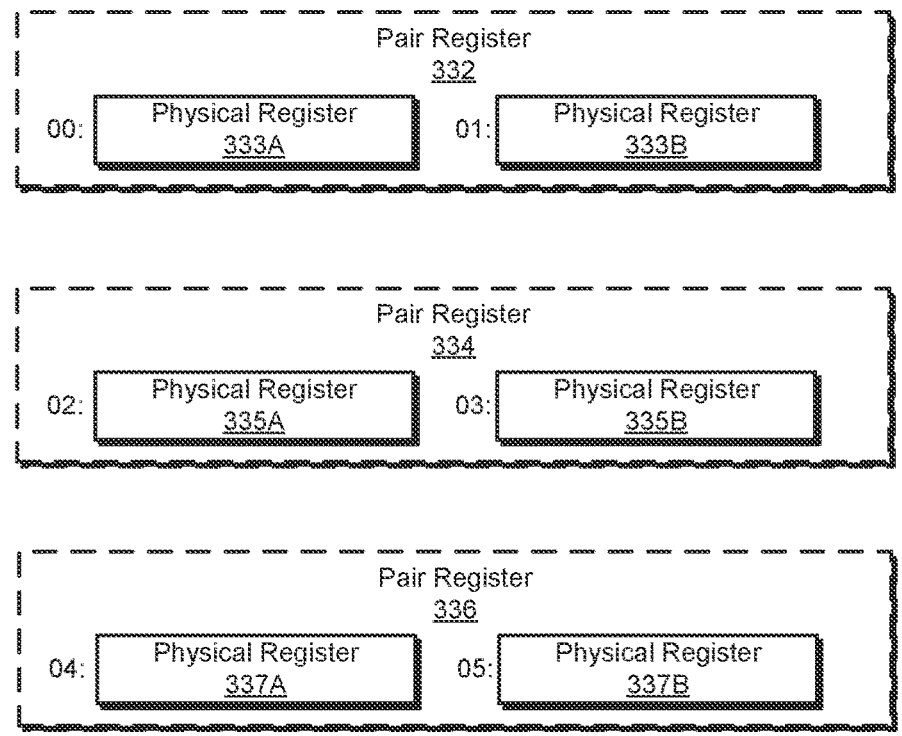
FIG. 3 is a block diagram of registers.

At rename stage 208, control circuit 112 may allocate registers to the dispatched micro-operation as needed. Control circuit 112 may access one or more of a register file 230 (which may correspond to and/or represent registers 130) a free list 240 (which may correspond to register list 140), and a split register list 250 (which may correspond to split register list 150). Register file 230 may correspond to an array of registers of processor 110. FIG. 3 illustrates a register file 330 (which may correspond to register file 230).

As illustrated in FIG. 3, register file 330 can include a pair register 332, a pair register 334, and a pair register 336. In some examples, processor 110 implements an architecture that may support wide instructions that may operate with data unit sizes greater than a register size of a physical register. For instance, a wide instruction or special instruction may operate with a data unit size that is twice the physical register size. The data unit size may correspond to a bit size of data units operated on by the instruction. In some examples, the data unit size also corresponds to an instruction width (e.g., a bit size of an instruction). To support wide instructions, processor 110 manages registers and physical register pairs such that a pair register size may be twice the physical register size. Thus, as shown in FIG. 3, pair register 332 includes a physical register 333A (having an address of "00") and a physical register 333B (having an address of "01"), pair register 334 includes a physical register 335A (having an address of "02") and a physical register 335B (having an address of "03"), and pair register 336 includes a physical register 337A (having an address of "04") and a physical register 337B (having an address of "05"). Although pair registers described herein include a pair of physical registers, in other implementations pair registers may include different numbers of physical registers, such as three, four, etc.

The physical registers for each register may be consecutive such that the register may include two contiguous physical registers, although in other examples the physical registers may not be consecutive. As seen in FIG. 3, because each pair register includes a pair of consecutive physical registers, each pair register is associated with an even address value. For example, pair register 332 has an address of 00 (as address 01 is considered a part of pair register 332). Similarly, pair register 334 has an address of 02 and pair register 336 has an address of 04. In other implementations, registers may have an odd address value, with the associated second physical register having an even address value.

During rename stage 208, processor 110 may allocate one of pair register 332, pair register 334, or pair register 336 based on availability. In other words, processor 110 may allocate two physical registers to an instruction. However, in some examples, an instruction may have a data unit size and/or instruction width that may be smaller than the pair register size. The instruction may not require two physical registers. The systems and methods described herein allow splitting a pair register into portions that may correspond to physical registers.

Figure 4:
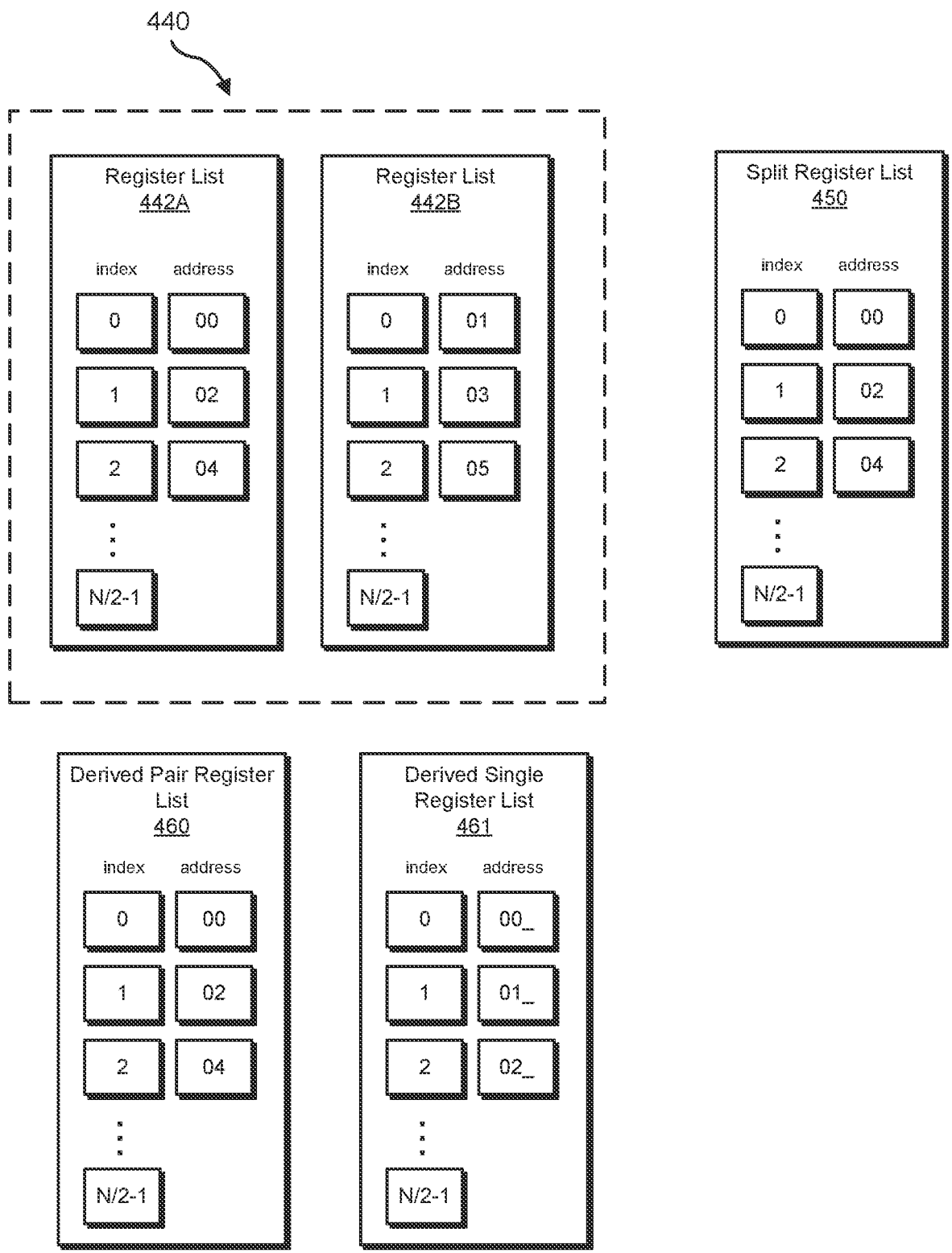
FIG. 4 is a diagram of exemplary lists for managing split registers.

FIG. 4 illustrates a register list 440, a split register list 450 (which may correspond to split register list 150 and/or split register list 250), a derived pair register list 460 and a derived single register list 461 (which may correspond to free list 240 and/or register list 140). In some examples, register list 440 includes a register list 442A and a register list 442B. Register list 442A tracks availability of physical registers corresponding to a first portion of a pair register and register list 442B tracks availability of physical registers corresponding to a second portion of the pair register. In some examples, register list 442A may track even physical registers (e.g., physical registers having even addresses) and register list 442B may track odd physical registers (e.g., physical registers having odd addresses). To avoid using a rename table or other complicated structure, the availabilities of pair registers and single registers are tracked with vectors, including derived pair register list 460 and derived single register list 461.

A size of the various register lists shown in FIG. 4 can be N/L, where N is maximum or total number of single physical registers available in a processor. In the examples described herein, N is 384 (e.g., 384 physical registers). L corresponds to a number of physical registers that may be combined, such as 2 physical registers combined into a pair register as described herein. L also corresponds to a number of lists and N is a multiple of L. In the examples described herein, L is 2, corresponding to 2 register lists (e.g., register list 442A and register list 442B), and further corresponding to pair registers including 2 physical registers (e.g., even and odd registers). Each of the lists (e.g., register list 442A, register list 442B, split register list 450, derived pair register list 460, and/or derived single register list 461) are indexed from [0 . . . N/L−1] and each hold data corresponding to different aspects of the registers. For example, register list 442A is implemented as a 192-bit vector (e.g., 384/2) that holds information on even addressable registers, whereas register list 442B is implemented as a 192-bit vector that holds information on odd addressable registers. In other examples, L may be a different value. In one particular example, if the physical registers are 128-bit sized registers, it may be desirable to be able to allocate one physical register to a 128-bit uop, two physical registers to a 256-bit uop, and four physical registers to a 512-bit uop, such that L may be 4 in this particular example.

Figure 5:
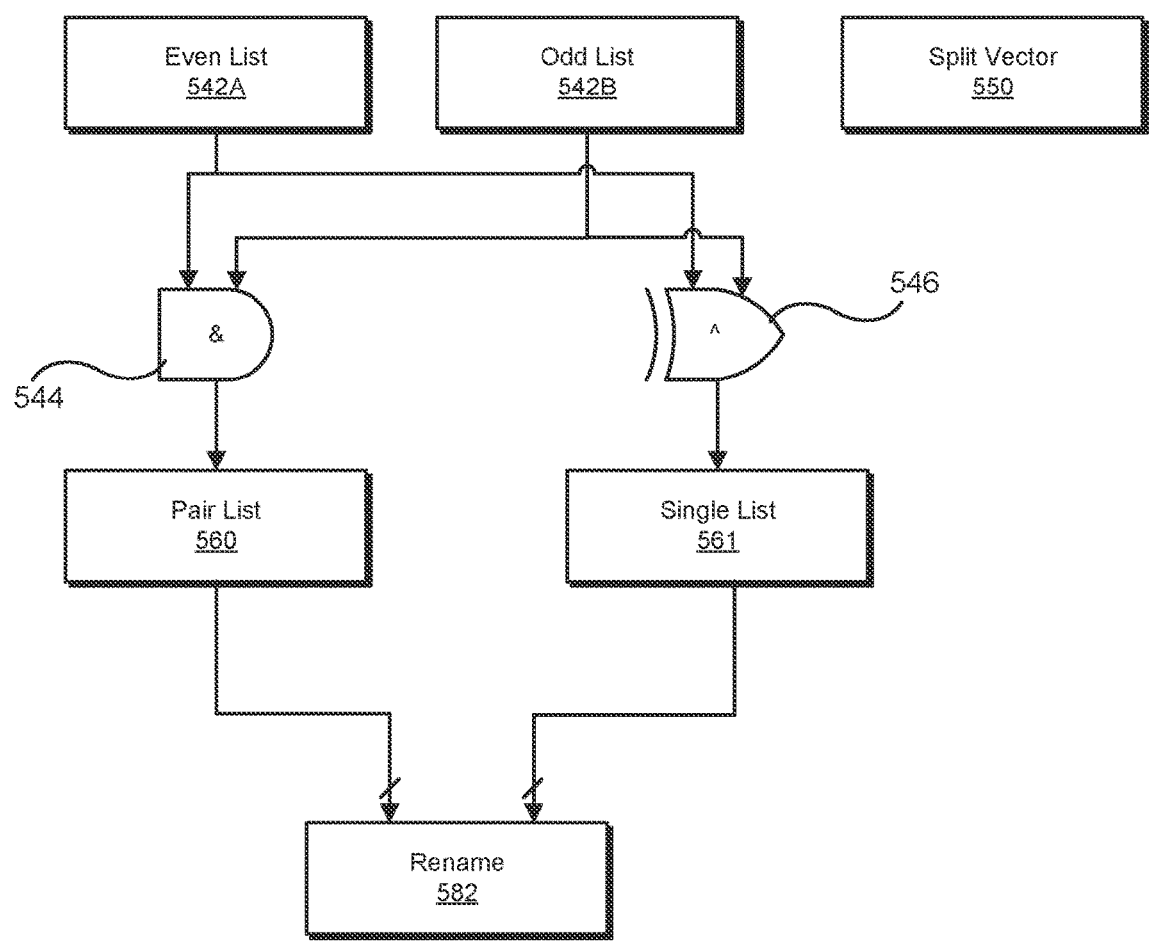
FIG. 5 is a simplified circuit diagram of deriving free lists.

Because pair registers are managed as pairs of physical registers (e.g., L=2), each pair register has an address (e.g., corresponding to a physical register number or PRN) with an even value, as further illustrated in FIG. 3. Derived pair register list 460 corresponds to a free pair list (indicating which pair registers are free) and derived single register list 461 corresponds to a free single register list (indicating which single registers are free). Derived pair register list 460 (which is also stored in registers) is a list derived from an AND combination of register list 442A and register list 442B. Derived single register list 461 (which is also stored in registers) is a list derived from an XOR combination of register list 442A and register list 442B. FIG. 5 illustrates an example simplified circuit 500 for deriving pair register and single register lists.

FIG. 5 includes an even list 542A, which may correspond to register list 442A, an odd list 542B, which may correspond to register list 442B, a split vector 550, which may correspond to split register list 150, an AND gate 544, an XOR gate 546, a pair list 560, which may correspond to derived pair register list 460, a single list 561, which may correspond to derived single register list 461, and a rename block 582, which may correspond to rename stage 208. Each of split vector 550, even list 542A, and odd list 542B has the same size of N/2 (e.g., 384/2=192-bit vector). As each marked bit in even list 542A and odd list 542B indicates a free portion of a pair register (e.g., a physical register), both the even and odd portions being free indicates a free pair register, whereas only one of the even and odd portions being free indicates a free single register. Thus, pair list 560 is derived using AND gate 544 and single list 561 is derived using XOR gate 546. For each index value, AND gate 544 marks the corresponding bit in pair list 560 if both even list 542A and odd list 542B have marked bits. In addition, for each index value, XOR gate 546 marks the corresponding bit in single list 561 if a bit in even list 542A or odd list 542B, but not both bits, are marked.

Returning to FIG. 4, derived pair register list 460 and derived single register list 461 comprise, in some examples, 192-bit vectors. In the example shown in FIG. 4, pair registers (e.g., pairs of portions) are identified by even address values such that derived pair register list 460 tracks even address values. Thus, a pair register from derived pair register list 460 has an even address value and includes 2 continuous free portions (e.g., the even address PRN and the following odd address PRN). Derived single register list 461 also tracks even address values, but may not have Least Significant Bit (LSB) information of the address values. To specifically identify the even or odd portion of a pair register is free, the LSB data can be queried against one of register list 442A and/or register list 442B to determine the LSB data. For example, register list 442B (e.g., odd addresses) is queried to determine the LSB status. For an index marked free in derived single register list 461, if the corresponding index in register list 442B is free, the LSB data indicates that the odd portion is free. Otherwise, if the corresponding index in register list 442B is not free, the LSB data indicates that the even portion is free. As described herein, derived single register list 461 is derived from an XOR operation. A marked bit also indicates that one portion of the corresponding pair register is not free in register list 442A or register list 442B.

When new pair registers are being formed (e.g., both portions of a pair register being freed), the corresponding address/bits in register list 442A and register list 442B are marked and propagated to derived pair register list 460. When only one of the address/bits in register list 442A and register list 442B is set (e.g., only one portion of a pair register is free), the corresponding even address value is set in derived single register list 461. Optionally in some examples, to reduce power consumption, new pairs may not be tracked (e.g., updating/deriving derived pair register list 460) unless a number of free pairs in derived pair register list 460 runs low, such as below a threshold number of free pair registers needed for an iteration of rename.

In some examples, split register list 450 tracks which registers have been split. Split register list 450 is implemented with a 192-bit vector. For example, as shown in FIG. 4, split register list 450 can track even address physical registers. A marked bit in split register list 450 for a register (which is indexed based on even address values) indicates that the corresponding pair register is split.

Turning back to FIG. 2, in some examples, during rename stage 208, control circuit 112 selects a free pair register (e.g., a physical register pair) for an instruction from derived pair register list 460. If the instruction has a data unit width matching the pair register size or instruction has other architectural signals (such as whether the instruction is a special instruction, type of operation, etc.), control circuit 112 allocates all of the selected pair register (e.g., both portions) to the instruction and indicates that the corresponding entry is not free in derived pair register list 460 (e.g., by unmarking the corresponding bits in register list 442A and register list 442B and updating derived pair register list 460 as described herein).

If the instruction has the data unit width less than the register size and there are no other architectural signals (such as whether the instruction is a special instruction, type of operation, etc.), control circuit 112 proceeds with allocating only a free portion (e.g., a free single physical register) of the selected pair register to the instruction. If the selected pair register has not already been split, control circuit 112 allocates the even portion of the selected pair register to the instruction and unmarks the corresponding bit in register list 442A. Control circuit 112 splits the selected pair register (making the odd portion available) by marking the appropriate bit in split register list 450 (e.g., marking the even address entry as split), and unmarking the appropriate bit in derived pair register list 460 (e.g., by updating/deriving derived register list 460 as described herein). Thus, the even portion of the selected pair register is allocated to the instruction and the odd portion is available to be allocated later. In addition, in some examples control circuit 112 may actively mark the appropriate bit of single free register portions (e.g., in register list 442B and updating derived single register list 461) as free if the instruction was previously allocated earlier due to architectural signal overrides (such as a register allocated in earlier stages of pipeline) in register list 442A and/or register list 442B.

If the selected pair register has been previously split (e.g., derived single register list 461 is providing a free register and/or derived pair register list 460 was not updated/derived), control circuit 112 allocates the even address value to the instruction if free, or the corresponding odd address value if free, and accordingly update the entry as not free in register list 440 (e.g., either register list 442A or register list 442B as well as in derived single register list 461). In some examples, if the instruction has the data unit width less than the register size, control circuit 112 may first check derived single register list 461 for a free register portion before selecting and splitting another free pair register.

In some examples, rename stage 208 may only get certain (e.g., P=6, S=6) selected register lists of either pair registers or single registers. In some examples, rename stage 208 may pre-emptively update entries in register list 440 and/or derived pair register list 460 as not free when a selected register list is transferred to rename stage 208, rather than marking entries as free or un-free afterwards. These selected register lists may be designated as not free when given to rename stage 208 from a free list block. A pair-selected register list of #P may be designated as not free from derived pair register list 460. A single selected register list of #S may be designated as not free from derived single register list 461, as well as in register list 442A or register list 442B depending on selected LSB data.

When a physical register is retired or otherwise returned after an instruction completes or due to any other cases (e.g., flushes and more), control circuit 112 updates the relevant lists (e.g., one or more of register list 140, split register list 150, free list 240, split register list 250, split register list 450, etc.) accordingly. For example, if the returned physical register has an even address value, control circuit 112 identifies whether it is a split register (by checking split register list 450). If the returned even physical register corresponds to a split register, control circuit 112 marks the corresponding entry in register list 442A as free. If the control circuit 112 determines that returned even physical register is not a split register marked in split register list 450, then control circuit 112 marks the appropriate entry as free in both register list 442A and register list 442B for the appropriate address. If the returned physical register has an odd address value, control circuit 112 marks the corresponding entry as free in register list 442B.

In some examples, control circuit 112 creates/derives a new pair register list and/or a new single register list (e.g., by updating/deriving as described herein) and writes to derived pair register list 460 and derived single register list 461. Control circuit 112 un-marks the appropriate bits of the newly created pair register in split register list 450. In some examples, control circuit 112 can complement derived pair register list 460 with a new pair list whereas control circuit 112 can write all the bits in the bit vector for derived single register list 461.

Returning to FIG. 2, at issue/execute stage 210, processor 110 and/or an execution unit thereof executes the dispatched micro-operations. Although FIG. 2 illustrates a basic example pipeline 200, in other examples processor 110 may perform the stages in various orders, repeat iterations, and/or perform stages in parallel.

Figure 6:
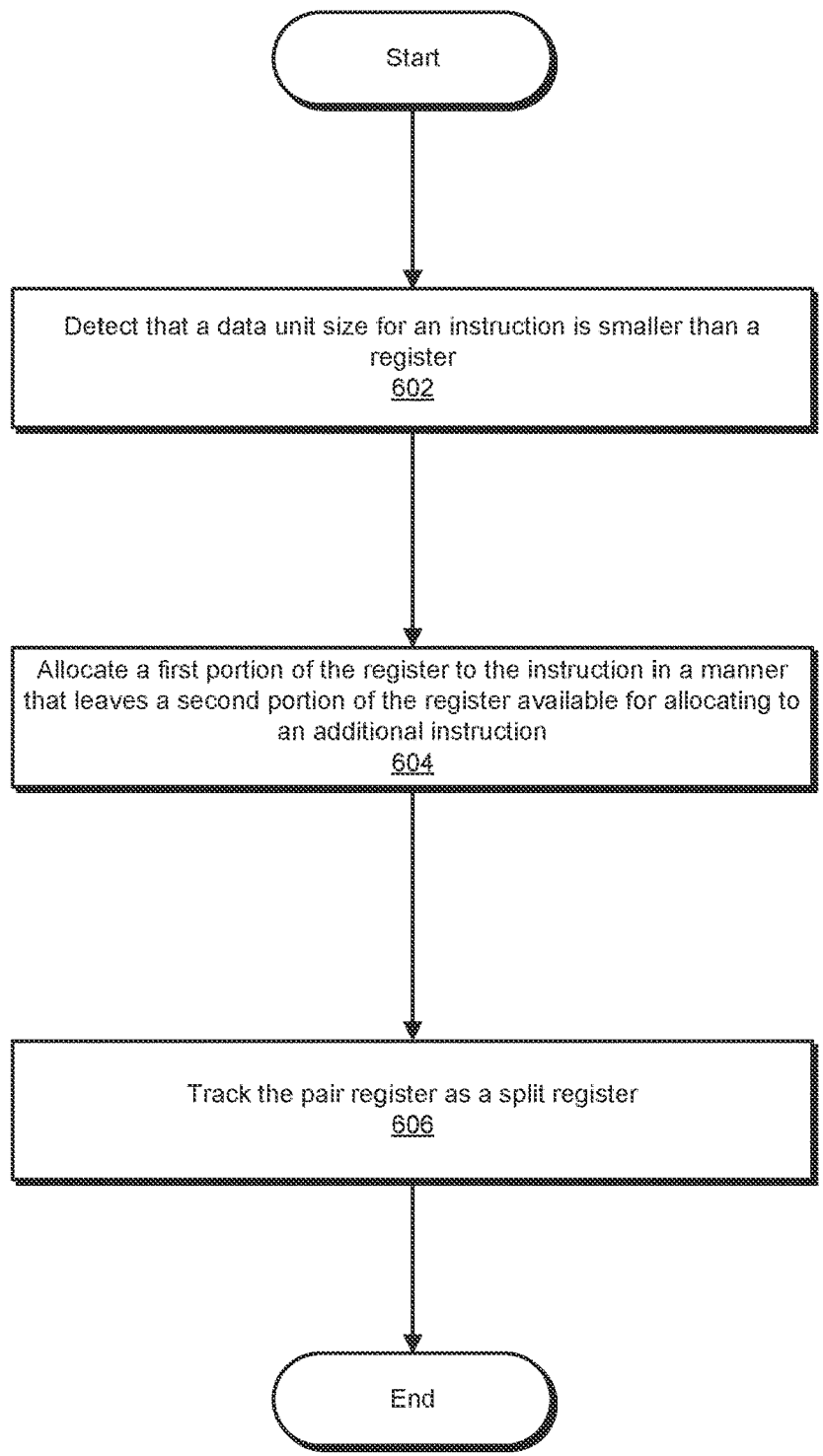
FIG. 6 is a flow diagram of an exemplary method for managing free registers for renaming using a split register list.

FIG. 6 is a flow diagram of an exemplary computer-implemented method 600 for managing split registers for renaming. The steps shown in FIG. 6 may be performed by any suitable computer-executable code and/or computing system, including the system illustrated in FIG. 1. In one example, each of the steps shown in FIG. 6 may represent an algorithm whose structure includes and/or is represented by multiple sub-steps, examples of which will be provided in greater detail below.

As illustrated in FIG. 6, at step 602 one or more of the systems described herein may detect that a data unit size for an instruction is smaller than a pair register. For example, control circuit 112 detects that a data unit size for an instruction is smaller than a pair register that control circuit 112 has selected.

The systems described herein may perform step 602 in a variety of ways. As described herein, the data unit size corresponds to an instruction width of the instruction and the size of the pair register may correspond to a wide instruction width (e.g., a physical register pair). In some examples, control circuit 112 may detect the data unit size from the instruction width or other architectural signals (such as whether the instruction is a special instruction, type of operation, etc.) of the instruction.

As further described herein, free registers are each tracked in the free register list as a pair of register portions or as a single portion free list. For example, register list 140 tracks free registers as a pair of physical registers. In some examples, derived pair register list 460 tracks available pair registers and derived single register list 461 tracks available single registers. In some examples, control circuit 112 selects a pair register from a free register list (e.g., from register list 140, derived pair register list 460 and/or derived single register list 461). Once the selected register is given to a rename block, the corresponding bit of the selected register is marked un-free from derived pair register list 460 or derived single register list 461.

At step 604 one or more of the systems described herein may allocate a first portion of the pair register to the instruction in a manner that leaves a second portion of the pair register available for allocating to an additional instruction. For example, control circuit 112 splits, after selecting a free register for the instruction, the selected pair register as described herein to allocate the first portion of the pair register to the instruction in a manner that leaves the second portion of the pair register available for allocating to an additional instruction.

The systems described herein may perform step 604 in a variety of ways. In one example, control circuit 112 splits the selected pair register (which has an even address value although in other implementations may have an odd address value) by marking the corresponding entry as split in split register list 450. Control circuit 112 allocates the second portion of the split register to another instruction in this cycle. If it cannot allocate the second portion to another instruction, control circuit 112 holds the second portion in a register in the rename block. This held register keeps the second portion from returning back to a free list. Control circuit 112 can also decide, before breaking a pair register, to allocate a previously-held second portion register (e.g., from previous cycles) to an appropriate new instruction (e.g., an instruction which has satisfied the condition that it is not a wide instruction and there are no other architectural signals to override) in this cycle. Control circuit 112 may proceed to clear the hold register in rename block.

As described above, if the selected register has already been split, control circuit 112 can allocate the first portion to the instruction. In another iteration, control circuit 112 can then allocate the second portion to a second instruction as needed.

Returning to method 600, at step 606 one or more of the systems described herein may track the pair register as a split register. For example, control circuit 112 tracks the pair register as a split register by updating relevant lists (e.g., one or more of register list 140, split register list 150, free list 240, split register list 250, split register list 450, etc.).

The systems described herein may perform step 606 in a variety of ways. In one example, tracking the register includes marking the register in a split register list (e.g., split register list 250 and/or split register list 450). The split register list tracks a split register based on one of even or odd address value such that the corresponding second portion has the other of even or odd address value. In some examples, control circuit 112 further tracks, in a free register portion list (e.g., register list 442B and/or derived register list 461), the second portion of the register.

In some examples, control circuit 112 marks the first portion as free (e.g., by updating register list 442A) when the instruction completes. In some examples, control circuit 112 marks the second portion as free (e.g., by updating register list 442B) when the corresponding instruction completes. In some examples, control circuit 112 marks the first and second portion as free (e.g., by updating register list 442A and 442B which may in some examples further update/derive derived pair register list 460 and/or derived single register list 461) when the corresponding instruction completes. Control circuit 112 may also unmark, in the split register list (e.g., split register list 450), the register when the first portion and the second portion are free to signify that the first and second portions have reformed a pair register.

Figure 7:
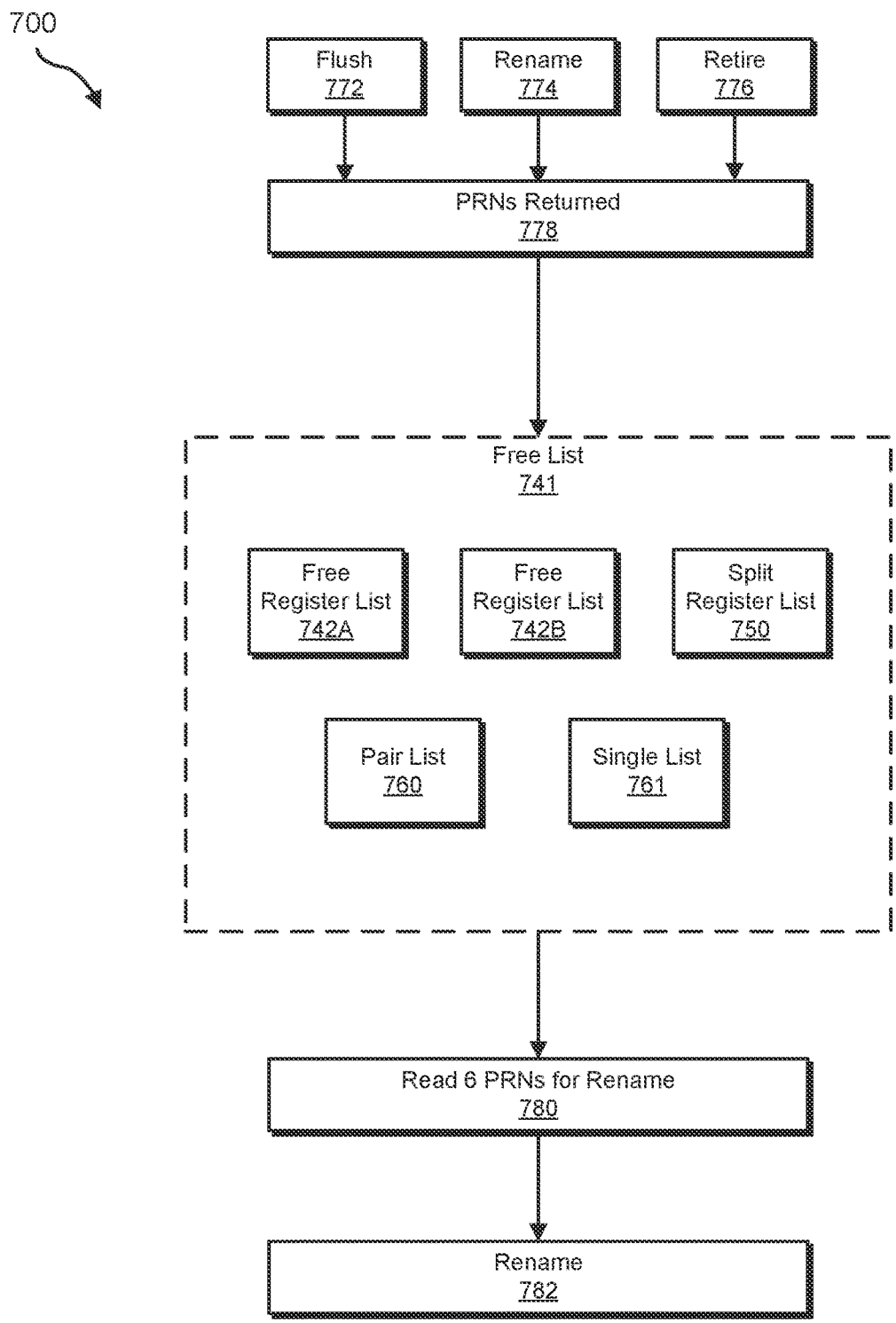
FIG. 7 is a simplified top-level view of an exemplary split register renaming workflow.

FIG. 7 illustrates a simplified top-level view of split register renaming process 700 as described herein. A flush block 772, a rename block 774, and a retire block 776 returns physical register numbers at 778 for updating free list 741 (which may correspond to register list 440), which may include updating one or more of free register list 742A (which may correspond to register list 442A), free register list 742B (which may correspond to register list 442B), split register list 750 (which may correspond to split register list 450), pair list 760 (which may correspond to derived pair register list 460), and single list 761 (which may correspond to derived single register list 461). From updated free list 741, additional PRNs (e.g., 6, although in other examples other amounts of PRNs may be used) are read at 780 for rename block 782.

Figure 8:
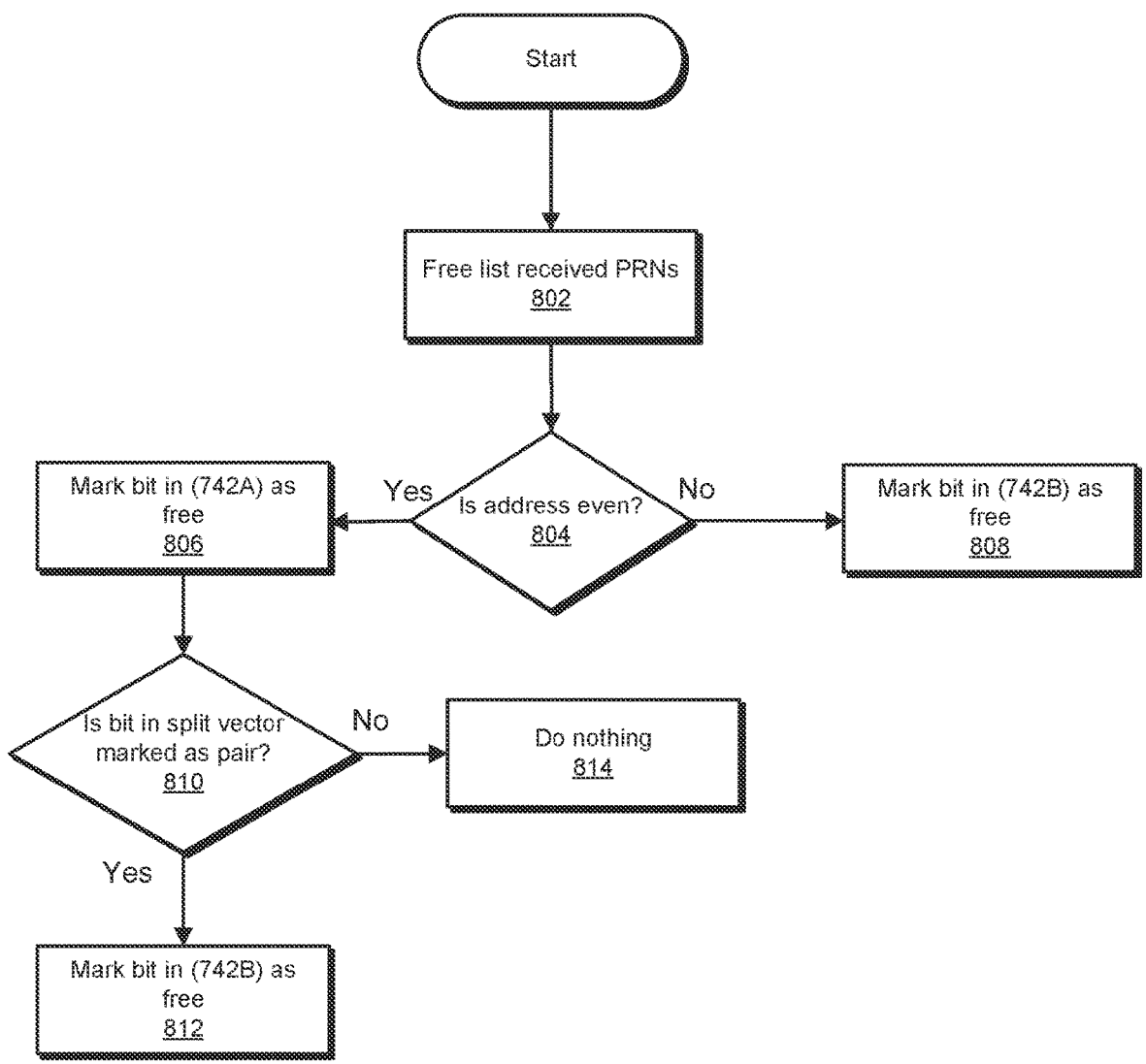
FIG. 8 is a flow diagram of an exemplary return workflow.

FIG. 8 illustrates a simplified flow diagram of a return process 800, with reference to FIG. 7, for example as performed at 778. At 802, the free list (e.g., free list 741) receives the PRNs returned, for instance the addresses returned to be freed. At 804, a given address of each PRN is evaluated as even or odd. If odd, which in some examples indicates a single PRN being freed, at 808 the corresponding bit in free register list 742B is marked as free.

If at 804 the address is even, which in some examples indicates a pair of registers being freed, at 806 the corresponding bit in free register list 742A is marked. At 810, the bit in the split vector (e.g., split register list 750) is checked whether it was marked as a pair register. If the bit was not marked as a pair register, then at 814 the process completes the current iteration. If the bit was marked as a pair register, then at 812 the corresponding bit in free register list 742B is marked as free, to indicate that both the even and odd portions of the pair register are free.

In one example of returning a PRN, for instance address 04 corresponding to index 2 as shown in FIG. 4 with respect to register list 442A, register list 442A is updated at index 2 to mark PRN 04 as free. Split register list 450 is checked to determine whether index 2 is split or is a pair register. If split register list 450 indicates a pair register, register list 442B is also updated at index 2 as free, to indicate that the pair register (e.g., both portions) are free. Register list 442B may not require updating if the returned PRN was not a pair register. In another example, for instance an odd address such as 01, register list 442B is updated at index 0.

Figure 9:
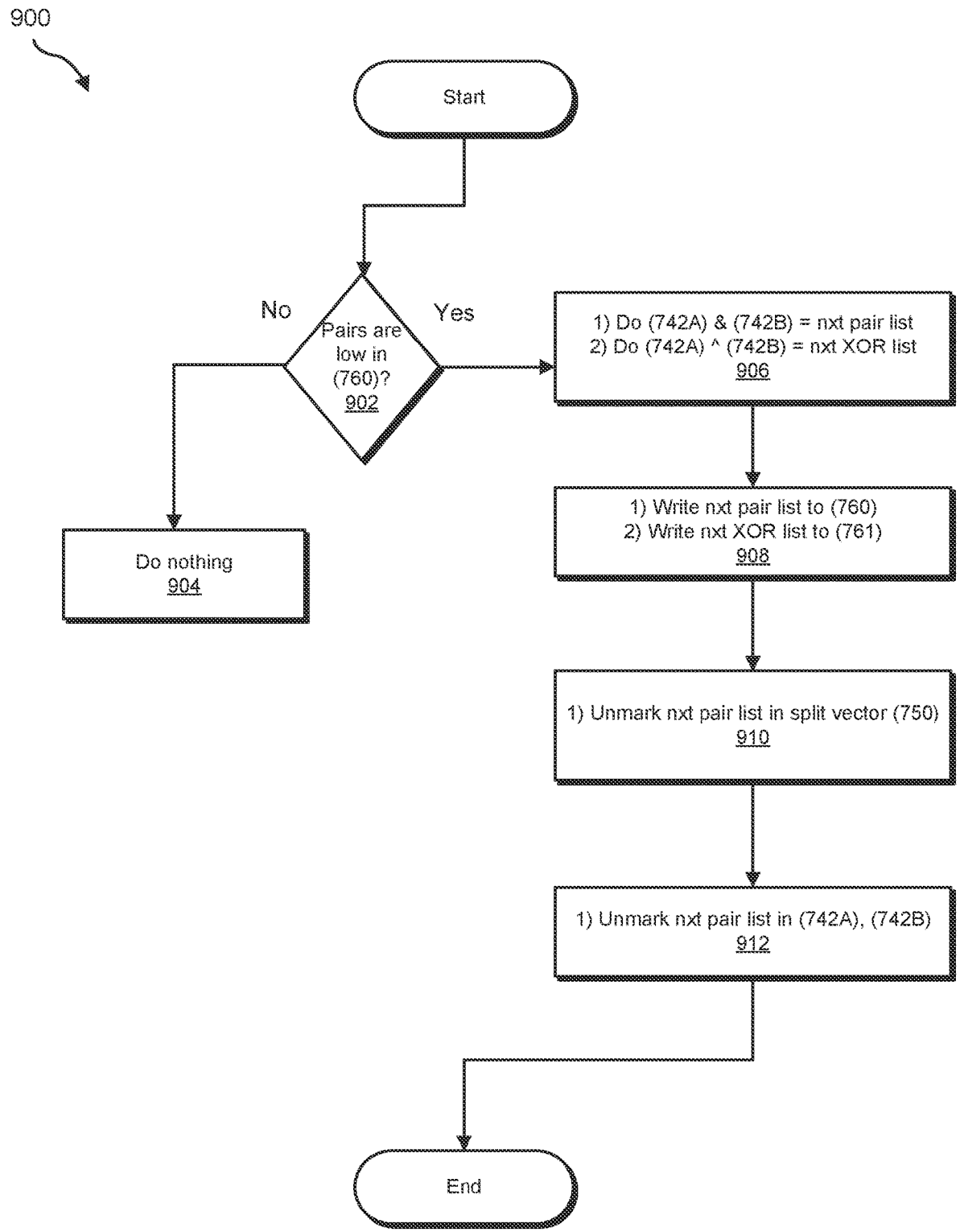
FIG. 9 is a flow diagram of an exemplary list updating workflow.

FIG. 9 illustrates a simplified flow diagram of a list updating process 900 with reference to FIG. 7, for example after returning PRNs and in some examples after process 800. At 902, pair list 760 is evaluated to determine whether a number of available pair registers is low (e.g., below a threshold number of pair registers for a current iteration), which indicates that pair list 760 requires updating. If the number of available pair registers is not low, process 900 completes the current iteration at 904.

If the number of pair registers is low at 902, process 900 proceeds to 906 for updating pair list 760 and single list 761. Free register list 742A is combined with free register list 742B using an AND operation (see also FIG. 5) to derive a next pair list. Free register list 742A is combined with free register list 742B using an XOR operation (see also FIG. 5) to derive a next XOR list.

At 908, the next pair list is written to pair list 760 for updating, and the next XOR list is written to single list 761 for updating. In addition, at 910, the next pair list is unmarked in split register list 750 to indicate that the newly derived pairs are not split. Similarly, at 912, the next pair list is unmarked in free register list 742A and free register list 742B.

The bit set in single list 761 is derived from free register list 742A or free register list 742B (as a single register) via an XOR operation, in which a resulting bit is marked if the corresponding bit was marked in free register list 742A (e.g., even address) or free register list 742B (e.g., odd address), but not both. Therefore, the next XOR list (and single list 761) is agnostic or otherwise unaware whether it contains even or odd PRN address values. The bits read out from single list 761 is used to determine all bits of the PRN address value except for LSBs but can further be queried or referenced against free register list 742B to determine if the single PRN is odd (indicated by a corresponding marked bit in free register list 742B) or even.

In one example of making a pair register, with reference to FIG. 4, PRN 04 and PRN 05 are free (in register list 442A and register list 442B, respectively). If a number of free pairs (e.g., pair free list counter) does not satisfy a threshold number of free pairs, (e.g., is less than or equal to the threshold number of free pairs, such as 24), a new pair is created from available free portions. PRN 04 is free, such that derived pair register list 460 is accordingly updated (e.g., index 2 may be marked as free). PRN 04 is marked as not free in register list 442A (e.g., at index 2), and PRN 05 is marked as not free in register list 442B (e.g., at index 2). Split register list 450 is marked (e.g., at index 2) as a pair, or not-split.

In one example of making a single register available, PRN 04 is free, and PRN 05 is not free. If the pair free list counter does not satisfy the threshold number of free pairs (e.g., is less than or equal to the threshold number of free pairs, which may be 24 for example), a new pair is needed. An XOR operation for PRN 04 and PRN 05 can determine if index 2 corresponds to a single register. Derived single register list 461 is accordingly updated at index 2 to mark as free. In some examples, if the pair free list counter satisfies the threshold number of free pairs (e.g., the number of free pairs is greater than the threshold number of free pairs), a new pair is not needed.

Figure 10A:
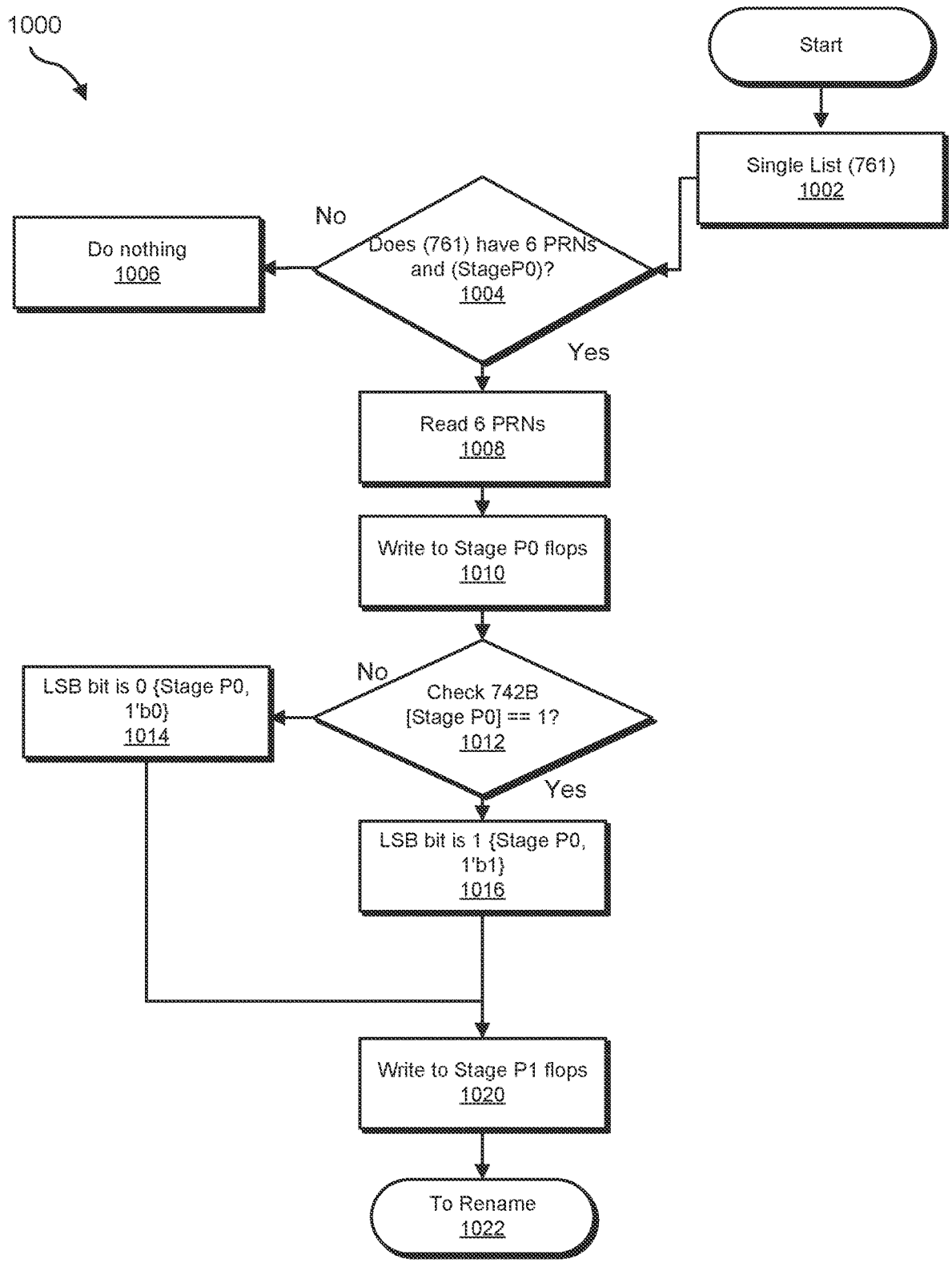
FIGS. 10A-B are flow diagrams of exemplary workflows for picking registers.
Figure 10B:
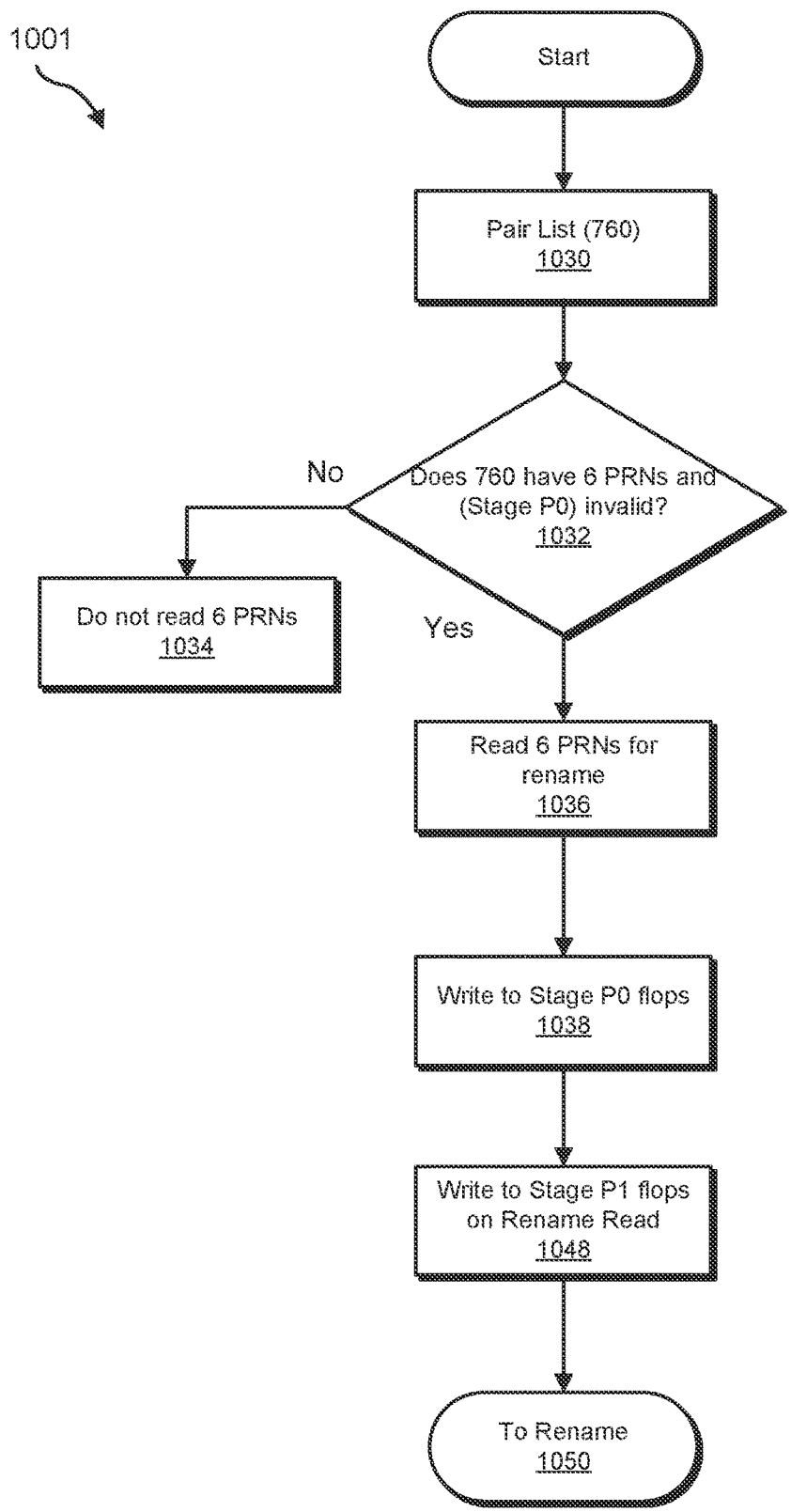

FIGS. 10A-B illustrate simplified flow diagrams of various picking processes with reference to FIG. 7. FIG. 10A illustrates a process 1000 for picking a single PRN. At 1002, single list 761 is provided and/or updated. At 1004, single list 761 is viewed to determine whether single list 761 has 6 PRNs available (although in other examples, other amounts of PRNs may be requested), and if Stage P0 (e.g., PRN 0) is invalid (e.g., a floating point register is needed). If neither condition is met, at 1006 the current iteration of process 1000 ends. Otherwise, at 1008 6 PRNs are read, and at 1010 written to Stage P0 flops. Using an appropriate scheme or method, Stage P0 is invalidated on Rename Read, and at the same time written to Stage P1 (e.g., PRN 1) flops.

Continuing to 1012, free register list 742B (e.g., odd address PRNs) is checked to determine if the Stage P0 address is marked. If it is not marked in free register list 742B, at 1014 it is determined that the LSB is 0. Otherwise, at 1016, it is determined that the LSB is 1. In addition, at 1020 the address or PRNs are written to Stage P1 flops on Rename read (e.g., new uops are in the pipeline, rename read is asserted to indicate that PRNs are required for the operation), and given to the rename block.

In one example of selecting a single PRN, with further reference to FIG. 4, after picking a single PRN (using, for example a find first N logic), the corresponding entry in derived single register list 461 is marked as un-free. The address of the picked PRN is checked against register list 442B to determine if the address is odd. If the picked PRN is found in register list 442B, it is marked as un-free in register list 442B and confirmed as odd. If the picked PRN is not found in register list 442B, then it is marked as un-free in register list 442A and confirmed as even.

For example, for PRN 04 (having index 2 in register list 442A), index 2 of derived single register list 461 may be marked as un-free. If index 2 of register list 442B is marked free, then PRN={2, 1'b1}=PRN 05. Otherwise, PRN={2, 1'b0}=PRN 04. For PRN 05, index 2 of register list 442B is marked as un-free. For PRN 04, index 2 of register list 442A is marked as un-free.

FIG. 10B illustrates a process 1001 for picking a pair register. At 1030, pair list 760 is provided and/or updated. At 1032, pair list 760 is viewed to determine whether pair list 760 has 6 PRNs available (although in other examples, other amounts of PRNs may be requested) and whether Stage P0 is invalid (e.g., needing a floating point register). If these conditions are not met, at 1034 the current iteration of process 1001 ends. Otherwise, continuing to 1036, 6 PRNs are read from pair list 760 for rename. At 1038, the addresses are written to Stage P0 flops. Using a scheme or method, Stage P0 is invalidated on Rename Read, at the same time as being written to Stage P1 flops.

Process 1001 continues to 1048 to write the addresses or PRNs to Stage P1 flops on Rename Read. Process 1001 ends its current iteration by giving PRNs to the rename block at 1050.

In one example of selecting a pair PRN, with further reference to FIG. 4, after picking a pair PRN (using for example, a find first N logic), such as PRN 04 (having index 2 in register list 442A), this PRN is marked in derived pair register list 460 as un-free. The rename stage can then use and/or allocate this pair PRN to a uop.

Figure 11A:
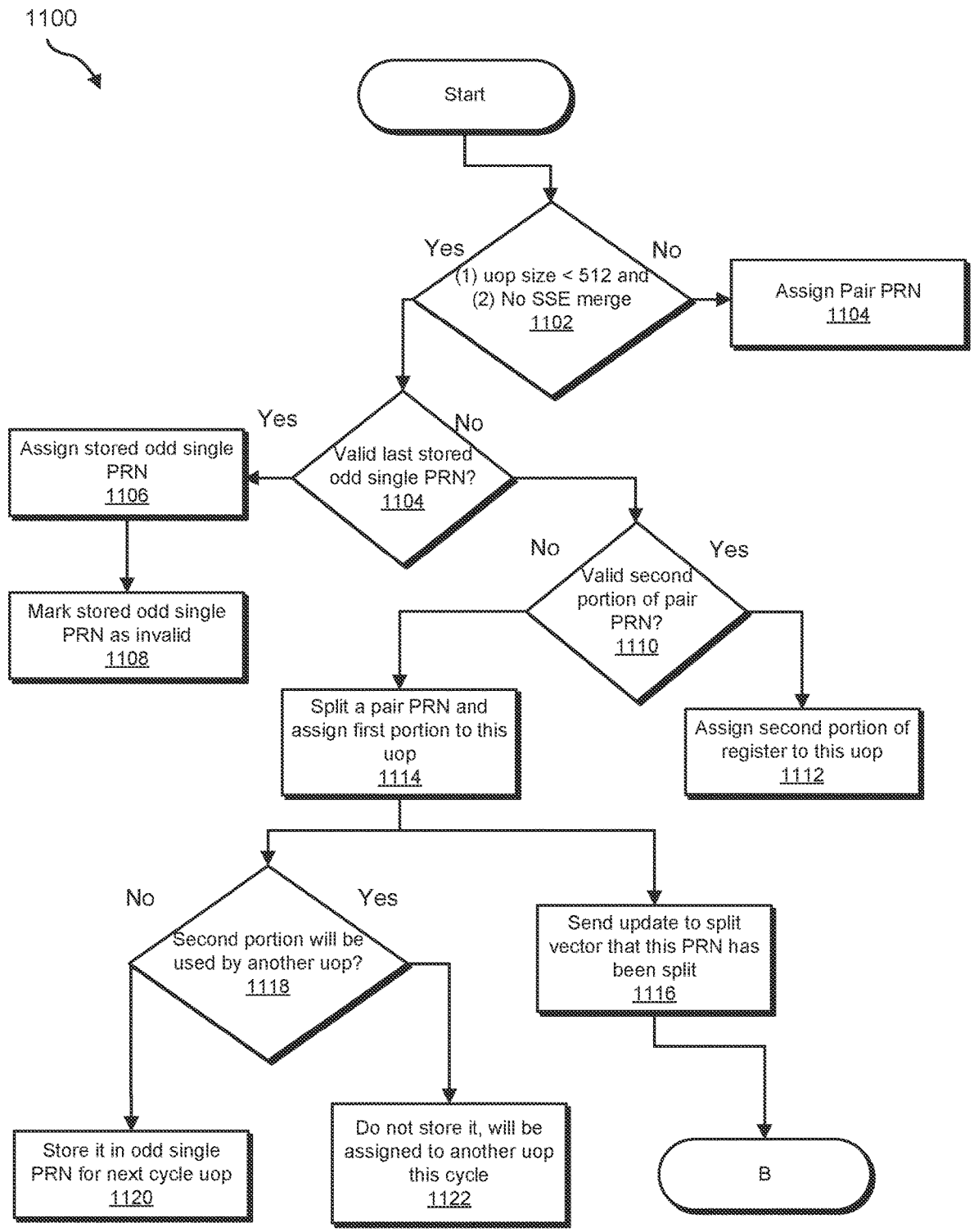
FIG. 11A-B is a flow diagram of an exemplary workflow for renaming.
Figure 11B:
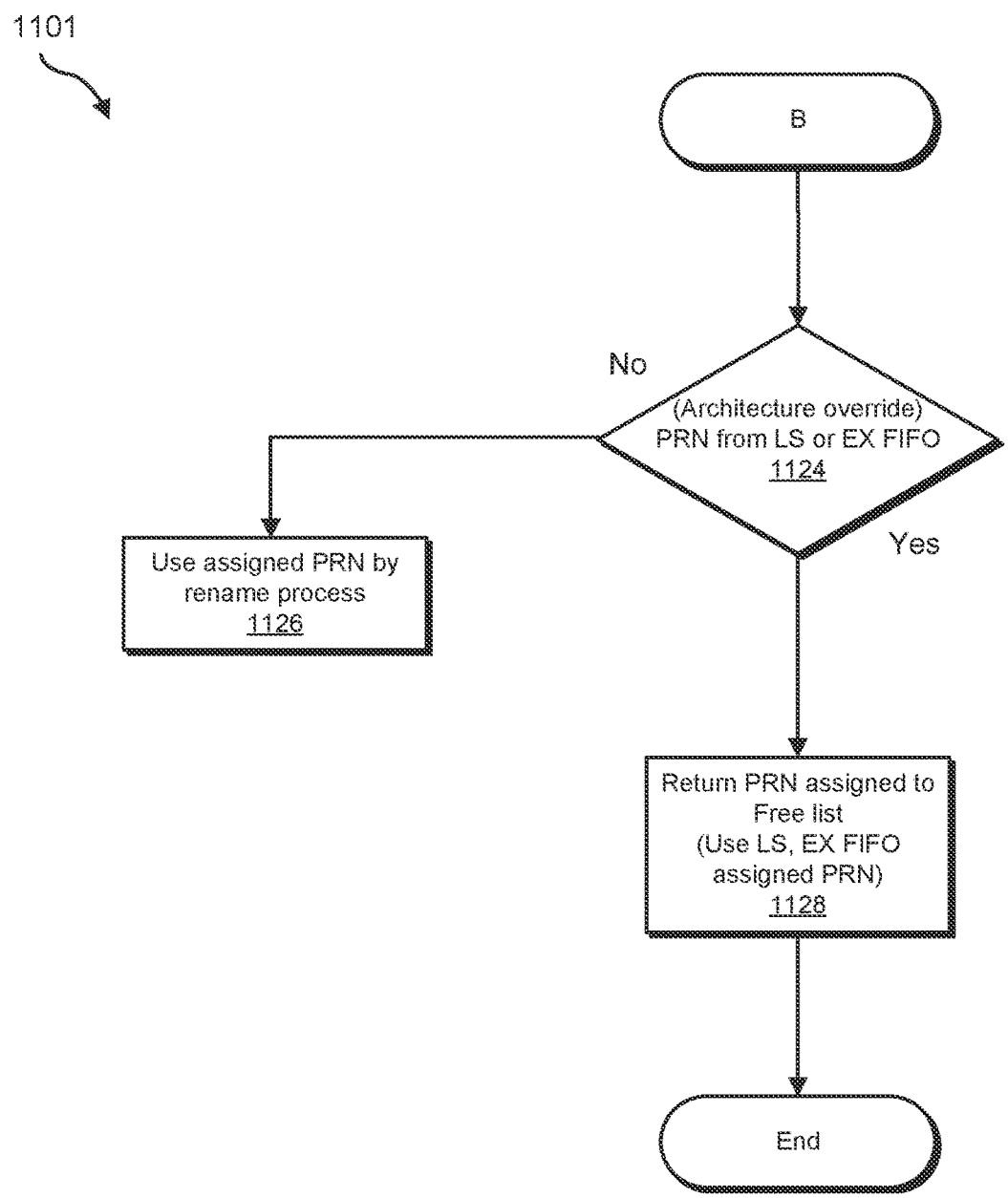

FIGS. 11A-B is a simplified flow diagram of an example renaming process 1100 in conjunction with the systems and methods described herein. At 1102, two conditions are evaluated: (1) whether the current uop size is less than 512 (e.g., whether the current instruction is less than a wide instruction size), and (2) whether there is no SSE merge (e.g., a merge-type operation for Streaming Single Instruction Multiple Data (SIMD) Extension (SSE), which in some examples correspond to an architectural signal of the instruction that requires a wide instruction-sized register). If any condition evaluates to false, then at 1104 a pair PRN is allocated. If the uop is determined to be 512 or SSE merge is set, then it will be allocated a pair PRN.

If both conditions are true (which indicates that a wide instruction-sized register is not required), then at 1104, the last stored odd single PRN may be evaluated as valid. If the last stored odd single PRN is valid (which indicates that the single PRN is free), then at 1106 the odd single PRN is allocated, and at 1108 the stored odd single PRN is marked as invalid (e.g., not free or un-free).

If at 1104 the last stored odd single PRN is not valid, then at 1110, it may be determined whether there is a valid second portion of a pair PRN. If there is a valid second portion of a pair PRN, at 1112 this second portion is allocated to the current uop.

If at 1110 there is no valid second portion, then at 1114 a pair PRN is split to allocate the first portion to the current uop. At 1118, it may be determined whether the second portion of the pair PRN (split at 1114) will be used by another uop in the current cycle. If the second portion will not be used by another uop this cycle, at 1120 the second portion is stored in the odd single PRN for a uop in the next cycle (e.g., at the next cycle's iteration of 1104). If the second portion will be used by another uop this cycle, at 1122 this second portion is allocated to the other uop this cycle rather than storing the second portion and avoiding a split of a new pair PRN in the current iteration of process 1100.

In addition, after splitting the pair PRN at 1114, at 1116 an update to the split vector (e.g., split register list 150, split register list 450, split register list 750, etc.) is sent to indicate that this pair PRN has been split. Process 1100 continues with process 1101 illustrated in FIG. 11B. At 1124, architecture overrides are checked, such that the uop may already have a PRN and may not need a PRN from the free list (e.g., a PRN allocated to the uop from Load/Store (LS)/Executing (EX) PRN first-in-first-out queue (FIFO) in earlier pipe stages). If there is no architecture override, at 1126 the PRN allocated by the rename process are used. Otherwise, at 1128 the PRN allocated by the rename process is returned to the free list and the PRN allocated by the LS or EX FIFO is used instead.

In one example of allocating a PRN during rename, with further reference to FIG. 4, PRN 04 may be a pair PRN. For a current uop read from dispatch, if the uop size is less than 512 and there is no SSE merge, then the availability of a stored split PRN is checked during rename. If there is a stored split PRN available and not yet allocated, this stored split PRN is allocated to the current uop. If the stored split PRN is available but allocated to another uop, then the availability of the corresponding second portion (which may have been split this cycle) is checked. If the second portion is available, it is allocated to the current uop. Otherwise, PRN 04 is split, and a first portion thereof allocated to the current uop. After splitting PRN 04, PRN 05 may be allocated to another uop in this cycle or stored to be used at the next cycle. If there is an SSE merge, then the current uop may be an SSE merge operation or otherwise be a 512-sized instruction such that a pair PRN may be allocated. Alternatively, if PRN 04 is a single PRN, and the current uop is not an SSE merge operation (or 512-bit instruction), PRN 04 may be allocated to the current uop.

The systems and methods described herein provide for flexibility in allocating free registers during a rename stage of a processor's instruction pipeline. In one example, a processor architecture may support 512-bit instructions which require 512-bit registers. The processor may have 384 physical registers that are each 256 bits, organized into 192 pairs of physical registers, such that each pair of physical registers satisfies the 512-bit size. To simplify management of registers, the processor may track 512-bit registers as a 256-bit physical register paired with a 256-bit shadow (physical) register for rename and 384-single physical registers to maintain complete list for returned physical register number.

The processor may further support smaller instructions, such as 256-bit instructions, 128-bit instructions, etc. Although 512-bit registers may be used for the smaller instructions, the shadow registers may be unused for the smaller instructions. Making the shadow registers available for use may increase an instructions per cycle performance of the processor. The shadow registers may be used by modifying the renaming scheme to map each physical register in a pair as a high or low logical register number. For example, one 512 uop requiring one 512-bit physical register, may be converted to two 256 uops requiring two 256-bit physical registers. However, such mapping may prohibitively add complexity and overhead to the renaming stage. Such modifications may require effectively doubling queue sizes. For example, the two uops may require tracking Hi and Lo logical register numbers mapped to two physical registers. Thus, rather than one instruction holding in the retire queue, scheduler queue and other queues, two or more instructions may need to be held, effectively reducing processor performance.

The systems and methods described herein may advantageously mitigate the overhead for managing the shadow registers. Rather than managing each physical register individually, the systems and methods described herein may manage physical register pairs (e.g., managing pairs using derived pair register list 460 and managing 192 single registers using derived single register list 461). For example, the processor may manage 192 register pairs. Because a register may be split as needed, normal renaming queues may not require doubling. A split register may be tracked based on its original register pair, with a bit vector for indicating whether a register was split, and another bit vector for indicating whether the split portion is free. In some examples, control circuit 112 may also allocate free single registers for uops. Thus, the systems and methods described herein may allow using shadow registers and/or all registers efficiently. This scheme can be expanded to allow only allocate appropriate physical registers to appropriate instruction widths without need to double queues, double rename and efficiently use all registers and support wide instructions in a processor.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SOCs), portions of one or more of the same, variations or combinations of one or more of the same, or any other suitable physical processor.

Although illustrated as separate elements, the modules described and/or illustrated herein may represent portions of a single module or application. In addition, in certain implementations one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the units recited herein may receive instruction data to be transformed, transform the instruction data, output a result of the transformation to determine whether to split a register, use the result of the transformation to split the register, and store the result of the transformation to manage the split register. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    detecting that a data unit size for an instruction is smaller than a pair register;
    allocating a first portion of the pair register to the instruction in a manner that leaves a second portion of the pair register available for allocating to an additional instruction; and
    marking the pair register as a split register using a split register list that tracks which pair registers have been split into first and second portions.

2. The method of claim 1, wherein detecting that the data unit size for the instruction is smaller than the pair register further comprises detecting the data unit size from at least one of an instruction width and architectural signals of the instruction.

3. The method of claim 1, wherein marking the pair register comprises setting a bit for the pair register in the split register list.

4. The method of claim 3, wherein the split register list tracks a split register based on one of even or odd address value such that the corresponding second portion has the other of even or odd address value.

5. The method of claim 3, further comprising unmarking, in the split register list, the pair register when the first portion and the second portion are free.

6. The method of claim 1, further comprising selecting a first or second portion of the pair register from a free register list.

7. The method of claim 1, further comprising marking the first portion as free when the instruction completes.

8. The method of claim 7, further comprising marking the second portion as free when the instruction completes.

9. The method of claim 1, further comprising marking the first and second portions as free when the instruction completes.

10. The method of claim 1, wherein the data unit size corresponds to an instruction width of the instruction.

11. The method of claim 1, wherein a size of the pair register corresponds to a wide instruction width.

12. The method of claim 11, wherein a size of a register portion corresponds to half of the wide instruction width.

13. A method comprising:
   detecting a data unit size from an architectural signal of an instruction;
   detecting that the data unit size for the instruction is smaller than a register size;
   selecting, for the instruction from a free register list, a free register having the register size;
   allocating a first portion of the selected register to the instruction in a manner that leaves a second portion of the selected register available for allocating to an additional instruction; and
   marking the selected register as a split register in a split register list that tracks which pair registers have been split into first and second portions.

14. The method of claim 13, wherein the split register list tracks a split register based on one of even or odd address value such that the corresponding second portion has the other of even or odd address value.

15. The method of claim 13, further comprising unmarking, in the split register list, the selected register when the first portion and the second portion are free.

16. The method of claim 13, wherein free registers are each tracked in the free register list as a pair of register portions.

17. The method of claim 13, further comprising marking the first portion as free when the instruction completes.

18. A system comprising:
   a physical memory; and
   at least one physical processor comprising:
      a plurality of registers;
      a control circuit for managing allocation of registers for instructions, the control circuit configured to:
      select, for an instruction having a data unit size smaller than a register, a free register of the plurality of registers from a free register list;
      allocate a first portion of the selected register to the instruction in a manner that leaves a second portion of the selected register available for allocating to an additional instruction; and
      mark the selected register as a split register in a split register list that tracks which pair registers have been split into first and second portions.

19. The system of claim 18, wherein free registers are each tracked in the free register list as a pair of register portions.

20. The system of claim 18, wherein the first and second portions of the selected register is tracked in a free register portion list.

* * * * *